(12) United States Patent
Ramanarayanan et al.

(10) Patent No.: US 10,587,488 B2
(45) Date of Patent: Mar. 10, 2020

(54) PERFORMANCE MONITORING SUPPORT FOR CFM OVER EVPN

(71) Applicant: Juniper Networks, Inc., Sunnyvale, CA (US)

(72) Inventors: Gowri Shankar Ramanarayanan, Bangalore (IN); Selvakumar Sivaraj, Sunnyvale, CA (US); Wen Lin, Andover, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/024,381

(22) Filed: Jun. 29, 2018

(65) Prior Publication Data

US 2020/0007422 A1 Jan. 2, 2020

(51) Int. Cl.
| | |
|---|---|
| H04L 12/26 | (2006.01) |
| H04L 12/46 | (2006.01) |
| H04L 12/24 | (2006.01) |
| H04L 12/721 | (2013.01) |
| H04L 12/723 | (2013.01) |

(52) U.S. Cl.
CPC ...... *H04L 43/0811* (2013.01); *H04L 12/4641* (2013.01); *H04L 41/06* (2013.01); *H04L 45/66* (2013.01); *H04L 45/50* (2013.01)

(58) Field of Classification Search
CPC ... H04L 41/06; H04L 41/065; H04L 41/0681; H04L 41/0695
USPC .............................. 370/241, 242, 248, 250
See application file for complete search history.

(56) References Cited

U.S. PATENT DOCUMENTS

| | | | | |
|---|---|---|---|---|
| 7,898,965 | B2* | 3/2011 | Mohan | H04L 43/10 370/241 |
| 7,996,559 | B2* | 8/2011 | Mohan | H04L 43/10 709/242 |
| 9,900,247 | B2* | 2/2018 | Sivaraj | H04L 45/66 |
| 10,243,821 | B2* | 3/2019 | Dorai | H04L 43/0811 |
| 2007/0014290 | A1 | 1/2007 | Dec et al. | |
| 2015/0326469 | A1* | 11/2015 | Kern | H04L 12/4641 370/254 |

(Continued)

OTHER PUBLICATIONS

IEEE 802.1ag, 2007, 259 pages.*

(Continued)

*Primary Examiner* — Dmitry Levitan
(74) *Attorney, Agent, or Firm* — Harrity & Harrity, LLP

(57) ABSTRACT

A network device may generate a route advertisement that includes a media access control (MAC) address. The MAC address may correspond to a data link established between the network device and a customer edge (CE) device. The network device and the CE device may be associated with an Ethernet virtual private network (EVPN) that includes other network devices that are remote from the CE device. The network device may cause the route advertisement to be outputted over the EVPN. The route advertisement may permit the other network devices to learn that the data link is directly reachable via the MAC address, and may permit the other network devices, when configured as maintenance endpoints (MEPs), to directly address performance monitoring-related unicast packets, intended for the data link, using the MAC address, such that flooding of the performance monitoring-related unicast packets is avoided.

20 Claims, 6 Drawing Sheets

(56) References Cited

U.S. PATENT DOCUMENTS

2018/0091445 A1* 3/2018 Singh ................... H04L 49/351

OTHER PUBLICATIONS

IETF 7432, 2015, 56 pages.*
Extended European Search Report for Application No. EP19165708.9, dated Nov. 8, 2019, 10 pages.
Sajassi A., et al., "Provider Backbone Bridging Combined with Ethernet VPN (PBB-EVPN); rfc7623.txt," Internet Engineering Task Force (IETF), Sep. 22, 2015, pp. 1-23, XP015107687.

* cited by examiner

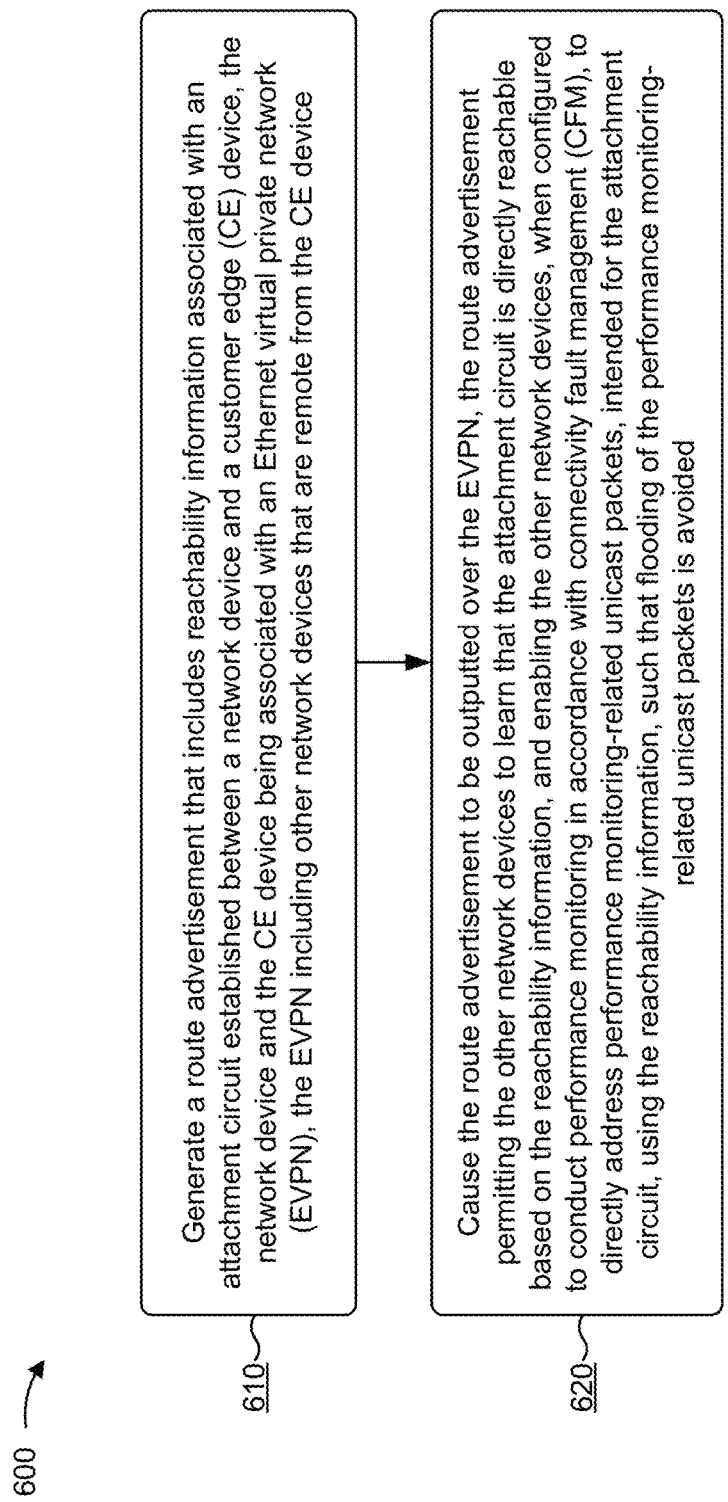

US 10,587,488 B2

PERFORMANCE MONITORING SUPPORT FOR CFM OVER EVPN

BACKGROUND

In an Ethernet virtual private network (EVPN), customer edge (CE) devices (e.g., hosts, routers, switches, firewalls, and/or the like) may be connected to provider edge (PE) devices (e.g., hosts, routers, switches, firewalls, and/or the like) to form the edge of a Multiprotocol Label Switching (MPLS) infrastructure. The PE devices may provide Layer 2 virtual bridge connectivity between the CE devices. Learning, between the PE devices (e.g., learning of media access control (MAC) addresses and/or the like), occurs in the control plane, which is in contrast to Virtual Private Local Area Network Service (VPLS) or bridging, where a PE device automatically learns MAC addresses, associated with other endpoints, in the data plane.

SUMMARY

According to some possible implementations, a method may include providing, by a first provider edge (PE) device, a route advertisement. The first PE device may be part of an Ethernet virtual private network (EVPN), and may be multihomed to by a first customer edge (CE) device. A first attachment circuit may be established between the first PE device and the first CE device. The route advertisement may include a media access control (MAC) address, corresponding to the first attachment circuit, that is utilized as a connectivity fault management (CFM) MAC address for a maintenance endpoint (MEP) configured on the first attachment circuit. The method may include receiving, by a second PE device, the route advertisement. The second PE device may be part of the EVPN, and may be communicatively coupled to a second CE device. A second attachment circuit may be established between the second PE device and the second CE device. The second PE device may be configured to monitor connectivity between the second attachment circuit and the first attachment circuit. The method may include causing, by the second PE device, traffic, relating to monitoring the connectivity, to be directed to the first PE device and/or to the first attachment circuit based on the route advertisement. The traffic may not be provided to any other PE device, on the EVPN, that is multihomed to by the first CE device.

According to some possible implementations, a network device may include one or more memories, and one or more processors to generate a route advertisement that includes a media access control (MAC) address. The MAC address may correspond to a data link established between the network device and a customer edge (CE) device. The network device and the CE device may be associated with an Ethernet virtual private network (EVPN). The EVPN may include other network devices that are remote from the CE device. The one or more processors may cause the route advertisement to be outputted over the EVPN. The route advertisement may permit the other network devices to learn that the data link is directly reachable via the MAC address, and may enable the other network devices, when configured as maintenance endpoints (MEPs), to directly address performance monitoring-related unicast packets, intended for the data link, using the MAC address, such that flooding of the performance monitoring-related unicast packets is avoided.

According to some possible implementations, a non-transitory computer-readable medium may store instructions that include one or more instructions that, when executed by one or more processors of a network device, cause the one or more processors to generate a route advertisement that includes reachability information associated with an attachment circuit established between the network device and a customer edge (CE) device. The network device and the CE device may be associated with an Ethernet virtual private network (EVPN). The EVPN may include other network devices that are remote from the CE device. The one or more instructions may cause the one or more processors to cause the route advertisement to be outputted over the EVPN. The route advertisement may permit the other network devices to learn that the attachment circuit is directly reachable based on the reachability information, and may enable the other network devices, when configured to conduct performance monitoring in accordance with connectivity fault management (CFM), to directly address performance monitoring-related unicast packets, intended for the attachment circuit, using the reachability information, such that flooding of the performance monitoring-related unicast packets is avoided.

BRIEF DESCRIPTION OF THE DRAWINGS

FIG. 6 is a flow chart of an example process for facilitating performance monitoring over an EVPN.

DETAILED DESCRIPTION

Figure 1:
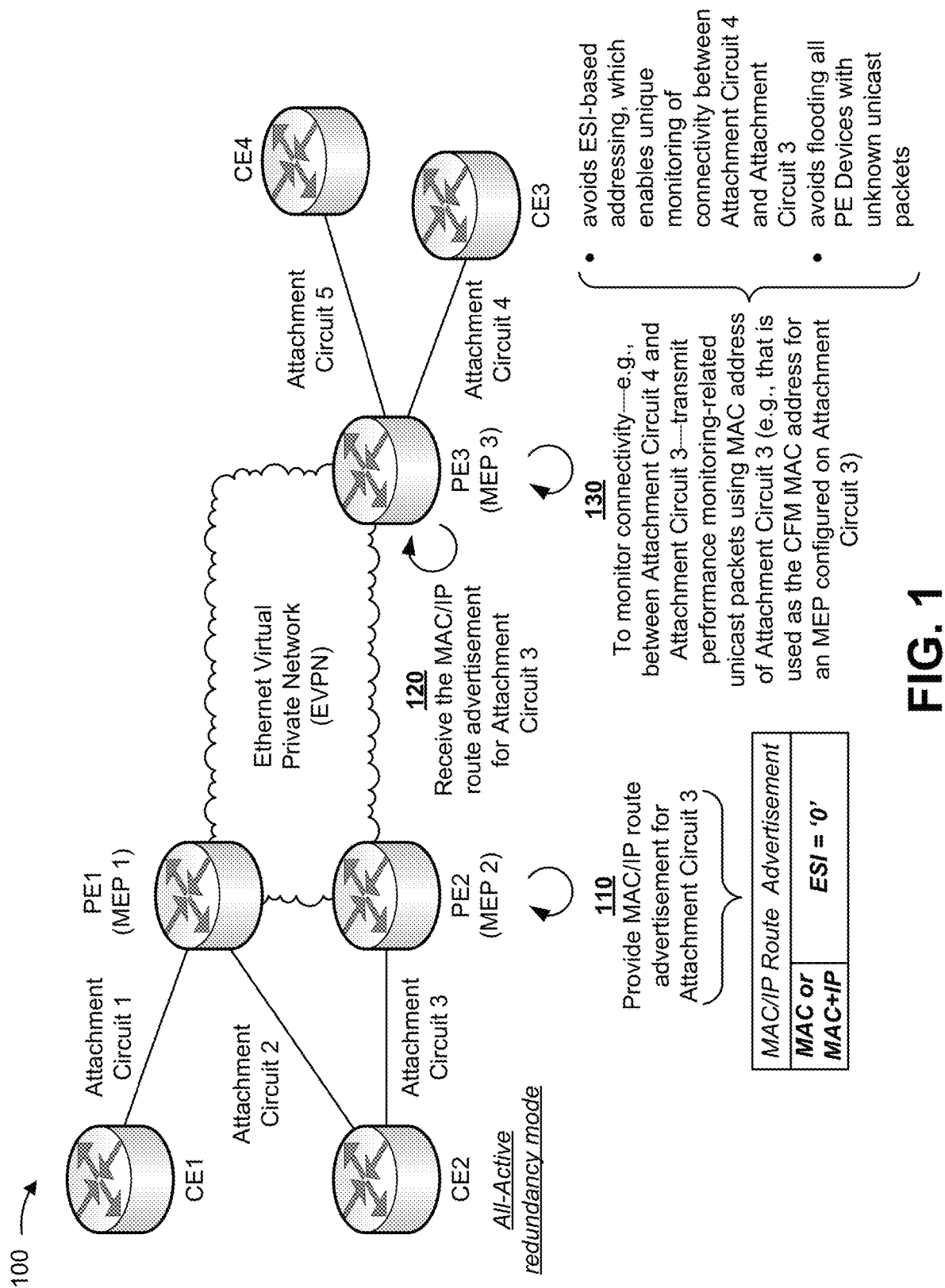
FIG. 1 is a diagram of an example implementation described herein.

The following detailed description of example implementations refers to the accompanying drawings. The same reference numbers in different drawings may identify the same or similar elements.

EVPN provides a multihoming feature that enables connection of a customer site to two or more PE devices to provide redundant connectivity. A CE device may thus be multihomed to different PE devices or to the same PE device. In a case where a CE device is multihomed to multiple PE devices in an EVPN, a multihoming mode of operation may determine which PE device (or devices) will forward traffic to the CE device. In a single mode, a default mode of operation, a PE device is connected to a single-homed customer site (e.g., a CE device that is connected only to the PE device). In this mode, an Ethernet segment value (e.g., an Ethernet segment identifier (ESI)) is not configured (e.g., is set to '0'). In an active-standby redundancy mode, only a single PE device, among a group of PE devices attached to an Ethernet segment, may be permitted to forward traffic to, and from, that Ethernet segment. In an active-active redundancy mode (also known as an all-active redundancy mode), all PE devices attached to an Ethernet segment may be permitted to forward traffic to, and from, the Ethernet segment.

In EVPN multihoming, traffic flow may be based on unicast traffic (e.g., point-to-point communications involving a single sender and a single receiver). In the all-active redundancy mode, unicast traffic, received from a remote PE device (e.g., from the core), and directed to a CE device, may be load-balanced to all multihomed PE devices. Similarly, unicast traffic, received from the CE device, and directed to a remote PE device (e.g., to the core), may be load-balanced to all the multihomed PE devices. Additionally, flood routes may be created for flooding packets, for example, when a unicast packet is received from the core.

As used herein, a packet may refer to a communication structure for communicating information, such as a protocol data unit (PDU), a network packet, a frame, a subframe, a datagram, a segment, a message, a block, a cell, a slot, a symbol, a portion of any of the above, and/or another type of formatted or unformatted unit of data capable of being transmitted via a network.

Recommendation ITU-T G.8013/Y.1731, which is in cooperation with the Institute of Electrical Engineers (IEEE) 802.1ag standard, also known as Ethernet Connectivity Fault Management (CFM), defines protocols and practices for Operations, Administration, and Management (OAM) for paths through local area networks (LANs), metropolitan area networks (MANs), and wide area networks (WANs). Recommendation ITU-T G.8013/Y.1731 defines protocols and procedures for monitoring, detecting, verifying, and isolating connectivity failures in various networks. Network devices, such as PE devices, may be associated with a particular maintenance domain. For example, a maintenance domain may refer to a network, or a portion of a network, where faults in connectivity may be managed. Additionally, the network devices may be associated with a particular maintenance association. For example, a maintenance association may refer to a set of PE devices, referred to as maintenance endpoints (MEPs), that are each configured with the same maintenance association identifier, and are established to monitor and verify the integrity of a service instance throughout a maintenance domain. An Up MEP session may be configured (e.g., for a single instance of a maintenance domain identifier and a maintenance association name) to monitor services in an EVPN associated with PE devices.

In some cases, MEPs may exchange continuity check messages (CCMs) that include information identifying respective statuses of interfaces associated with respective MEPs. For example, assume that a first PE device (a first MEP) and a second PE device (a second MEP) are associated with an EVPN, that the first PE device establishes connectivity with a first CE device over a first attachment circuit, and that the second PE device establishes connectivity with a second CE device over a second attachment circuit. In this case, network traffic may be exchanged between the first CE device and the second CE device via the EVPN and via the first PE device and the second PE device.

An EVPN network supports certain CFM features, including monitoring connectivity between two PE devices in an all-active or active-standby multihomed configuration, performance monitoring (e.g., delay measurement (ETH-DM) and synthetic loss measurement (ETH-SLM)), and monitoring connectivity between PE devices and CE devices. In an EVPN, however, a PE device does not automatically learn how to directly reach another PE device's attachment circuit for purposes of CFM—that is, the PE device does not automatically learn a CFM MAC address associated with the other PE device's attachment circuit (e.g., the MAC address of the other PE device's attachment circuit). Thus, if a particular PE device, configured as an MEP, needs to conduct performance monitoring between the particular PE device's attachment circuit and an attachment circuit of another PE device on the EVPN, performance monitoring-related unicast packets transmitted by the particular PE device may be treated as unknown unicast packets, and thus flooded to all the PE devices on the EVPN. Such flooding may occur even in a case where the EVPN is a multipoint-to-multipoint network. This results in increased network traffic, which negatively impacts network performance, and may even lead to loss of network service. Additionally, in a multihomed case (e.g., in an all-active redundancy mode), a first multihomed PE device may advertise only reachability information, for the first multihomed PE device's attachment circuit, by specifying an ESI in a Type 2 route advertisement, and a second multihomed PE device, on the same Ethernet segment as the first multihomed PE device, may advertise only reachability information, for the second multihomed PE device's attachment circuit, by specifying the same ESI. This may occur, for example, if CFM MAC addresses are advertised via ESI (whereas, if CFM MAC addresses are not learned, performance monitoring-related unicast packets may be treated only as unknown unicast packets). In such a case, a remote PE device, configured as an MEP to conduct performance monitoring between the remote PE device's attachment circuit and the first multihomed PE device's attachment circuit, for example, may transmit performance monitoring-related unicast packets by referencing only the ESI. This results in unicast traffic, received from the remote PE device, being load-balanced to the first multihomed PE device and the second multihomed PE device, despite the unicast traffic being intended only for the first multihomed PE device's attachment circuit. This prevents an MEP (e.g., a remote PE device) from being able to uniquely monitor connectivity between individual attachment circuits.

Some implementations, described herein, enable a multihomed PE device in an EVPN to advertise a MAC address of the multihomed PE device's attachment circuit (e.g., used as the CFM MAC address for an MEP configured on the attachment circuit), to other PE devices on the EVPN (e.g., over the control plane). In some implementations, the MAC address may be advertised via a Type 2 route, where a value of the ESI is set to '0'. In some implementations, the MAC address may not be added locally at the multihomed PE device, but may only be advertised, by the multihomed PE device, to remote PE devices to indicate that the multihomed PE device's attachment circuit may be reached using the MAC address.

In this way, a remote PE device, configured as an MEP (e.g., in an Up MEP session), may directly transmit performance monitoring-related unicast packets to the multihomed PE device using the advertised MAC address. This eliminates the possibility of such unicast packets being treated as unknown unicast packets and flooded (e.g., as a traffic storm) to all PE devices on an EVPN, which reduces unneeded network traffic, thereby improving overall network performance. This also permits a remote PE device, configured as an MEP, to uniquely monitor connectivity between individual attachment circuits in a multihomed network operating in the all-active redundancy mode, which enables appropriate identification of connectivity issues over an EVPN, thus improving CFM, including various related procedures, such as Loopback and Linktrace. For example, implementations, described herein, assist with Linktrace in an EVPN topology.

FIG. 1 is a diagram of an example implementation 100 described herein. As shown in FIG. 1, example implementation 100 may include an EVPN associated with multiple CE devices, including CE1, CE2, CE3, and CE4, and multiple PE devices, including PE1, PE2, and PE3 configured to function as MEPs (e.g., MEP 1, MEP 2, and MEP 3). As shown, an attachment circuit 1, may be established between PE1 and CE1, an attachment circuit 2, may be established between PE1 and CE2, and an attachment circuit 3, may be established between PE2 and CE2. As further shown, an attachment circuit 4, may be established between PE3 and CE3, and an attachment circuit 5, may be established between PE3 and CE4. Here, CE2 may be multihomed to PE1 and PE2 in an all-active redundancy mode.

As shown by reference number 110, PE2 may provide a media access control/Internet Protocol (MAC/IP) route advertisement for attachment circuit 3. For example, PE2 may provide a Type 2 route advertisement, in a control plane (e.g., over a local interface), that includes a MAC address associated with attachment circuit 3 (e.g., a MAC address associated with a port of PE2 that forms attachment circuit 3 with CE2, and used as the CFM MAC address for the MEP configured on attachment circuit 3). This enables other PE devices on the EVPN, such as PE1 and PE3, to learn, on the control plane, the MAC address that may be used to directly reach attachment circuit 3 (e.g., for performance monitoring purposes). In some implementations, a value of the ESI in the MAC/IP route advertisement may be set to '0'. This will avoid other PE devices on the EVPN (e.g., PE1 and PE3) from learning reachability information for attachment circuit 3 via ESI properties, and addressing performance monitoring-related packets using an ESI.

Although not shown, PE1 may similarly provide a MAC/IP route advertisement for attachment circuit 1 and a MAC/IP route advertisement for attachment circuit 2 (e.g., a Type 2 route advertisement that includes a MAC address associated with attachment circuit 1 (e.g., used as the CFM MAC address for the MEP configured on attachment circuit 1) and a Type 2 route advertisement that includes a MAC address associated with attachment circuit 2 (e.g., used as the CFM MAC address for the MEP configured on attachment circuit 2), and PE3 may similarly provide a MAC/IP route advertisement for attachment circuit 4 and a MAC/IP route advertisement for attachment circuit 5 (e.g., a Type 2 route advertisement that includes a MAC address associated with attachment circuit 4 (e.g., used as the CFM MAC address for the MEP configured on attachment circuit 4) and a Type 2 route advertisement that includes a MAC address associated with attachment circuit 5 (e.g., used as the CFM MAC address for the MEP configured on attachment circuit 5)). In this way, all PE devices on the EVPN may learn the MAC addresses of all the attachment circuits (e.g., used as the CFM MAC addresses for the MEPs configured on such attachment circuits), and utilize individual ones of the MAC addresses to send directed performance monitoring-related traffic to individual ones of the attachment circuits.

As shown by reference number 120, PE3 may receive the MAC/IP route advertisement for attachment circuit 3. For example, PE3 may receive the MAC/IP route advertisement via the control plane. In this way, PE3 may learn the MAC address of attachment circuit 3 (e.g., used as the CFM MAC address for the MEP configured on attachment circuit 3), and may store, in a data structure (e.g., a routing table, a forwarding table, a session table, a flow table, and/or the like) in PE3, information associating the MAC address with data regarding attachment circuit 3. In some implementations, and in a case where PE1 also provides MAC/IP route advertisements (e.g., for attachment circuit 1 and/or attachment circuit 2) similar to that provided by PE2, PE3 may also receive such MAC/IP route advertisements and/or store similar information in the data structure.

As shown by reference number 130, PE3 may (e.g., functioning as an MEP (e.g., MEP 3) based on an MEP session being established to facilitate CFM) perform an action relating to monitoring connectivity between one or more attachment circuits associated with PE3 (e.g., attachment circuit 4 and/or attachment circuit 5) and one or more other attachment circuits associated with other PE devices (e.g., attachment circuit 1, attachment circuit 2, and/or attachment circuit 3). For example, in a case where connectivity between attachment circuit 4 and attachment circuit 3 is to be monitored, PE3 may generate and transmit performance monitoring-related unicast packets (e.g., associated with ETH-DM, ETH-SLM, Ethernet Loopback, Ethernet Linktrace, and/or the like) that are addressed directly to the MAC address of attachment circuit 3 (e.g., used as the CFM MAC address for the MEP configured on attachment circuit 3).

In this way, rather than advertising the presence of an attachment circuit by simply specifying an ESI that is associated with the attachment circuit (e.g., as in a prior case, where unicast packets would be transmitted to all multihomed PE devices rather than only to a PE device associated with a particular attachment circuit), a PE device, on an EVPN, may advertise a MAC address associated with an attachment circuit (e.g., as if the attachment circuit corresponds to a single-homed interface that is reachable only via that PE device). This enables all peer PE devices, on the EVPN, to learn reachability information associated with individual attachment circuits, and utilize the reachability information to uniquely monitor connectivity across the EVPN. This also eliminates the possibility of performance monitoring-related unicast packets being treated as unknown unicast packets and flooded (e.g., as a traffic storm) to all PE devices on an EVPN, which reduces unneeded network traffic, thereby improving overall network performance. Furthermore, enabling PE devices to learn MAC addresses of attachment circuits (e.g., used as CFM MAC addresses for MEPs configured on such attachment circuits) in this manner also facilitates Linktrace procedures, since Linktrace procedures leverage such MAC addresses.

As indicated above, FIG. 1 is provided merely as an example. Other examples are possible and may differ from what was described with regard to FIG. 1.

Figure 2:
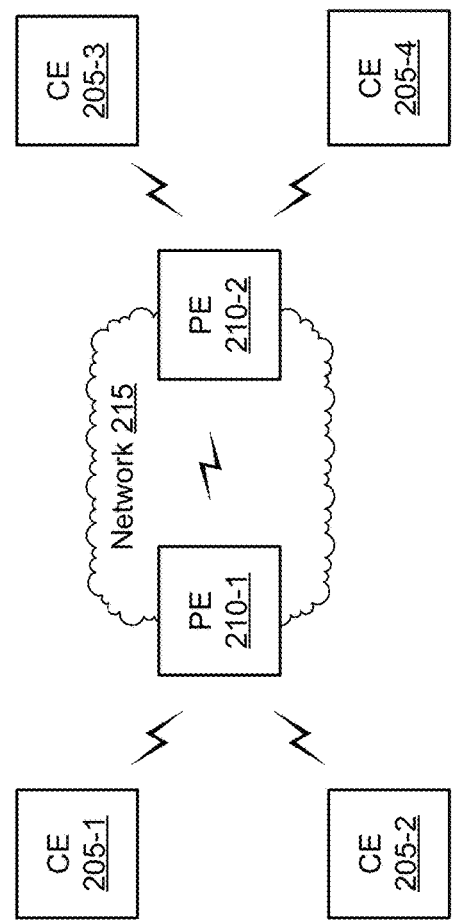
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include CE devices 205-1 through 205-4 (herein collectively referred to as CEs 205, and individually as CE 205), PE devices 210-1 and 210-2 (herein collectively referred to as PEs 210, and individually as PE 210), and a network 215. Devices of environment 200 may interconnect via wired connections, wireless connections, or a combination of wired and wireless connections.

CE 205 includes a device, positioned at an edge of a customer network, that is capable of processing and/or transferring traffic associated with PEs 210. For example, CE 205 may include a router, a gateway, a switch, a server, a modem, a network interface card (NIC), a hub, a bridge, an optical add-drop multiplexer (OADM), and/or the like. In some implementations, a CE 205 may be multihomed to multiple PEs 210 (e.g., in an all-active redundancy mode), and form attachment circuits with such PEs 210, as described elsewhere herein.

PE 210 includes a device, positioned at an edge of a service provider network, that is capable of processing and/or transferring traffic associated with CEs 205. For example, PE 210 may include a router, a gateway, a switch, a server, a modem, a NIC, a hub, a bridge, an OADM, and/or the like. In some implementations, PE 210 may be an ingress PE and/or an egress PE associated with network 215. In some implementations, PE 210 may be a physical device implemented within a housing, such as a chassis. In some implementations, PE 210 may be a virtual device implemented by one or more computer devices of a cloud computing environment or a data center. In some implementations, PEs 210 may be configured as MEPs for purposes of CFM, and may be configured to advertise MAC addresses of associated attachment circuits (e.g., used as CFM MAC addresses for MEPs configured on such attachment circuits), in a control plane, such that peer PEs 210 may direct performance monitoring-related traffic to individual attachment circuits based on the MAC addresses of those attachment circuits, as described elsewhere herein.

Network 215 includes one or more wired and/or wireless label switching networks that support EVPN. For example, network 215 may include an MPLS network, a generalized MPLS (GMPLS) network, and/or the like. In some implementations, network 215 may include a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, a private network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Notably, while example environment 200 includes a particular quantity of CEs 205, PEs 210, and networks 215, the devices and networks of example environment 200 are provided for explanatory purposes. In other words, the quantity of CEs 205, PEs 210, and/or networks 215 may differ from that shown in example environment 200.

Figure 3:
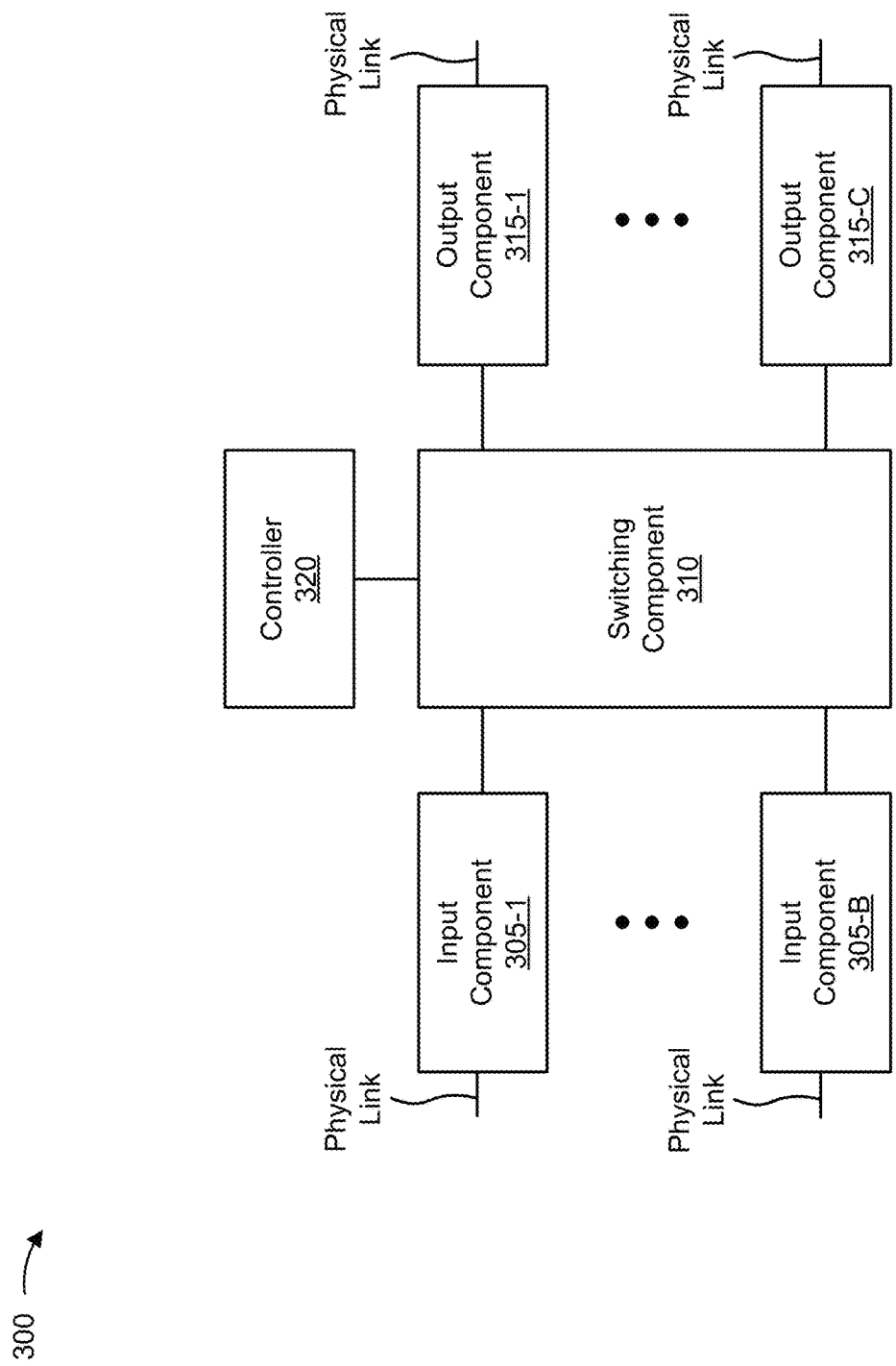
FIG. 3 is a diagram of example components of one or more devices of FIG. 2.

FIG. 3 is a diagram of example components of a device 300. Device 300 may correspond to PE 210 or CE 205. In some implementations, PE 210 or CE 205 may include one or more devices 300 and/or one or more components of device 300. As shown in FIG. 3, device 300 may include one or more input components 305-1 through 305-B (B≥1) (hereinafter referred to collectively as "input components 305," and individually as "input component 305"), a switching component 310, one or more output components 315-1 through 315-C(C≥1) (hereinafter referred to collectively as "output components 315," and individually as "output component 315"), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., an input/output component may be a combination of input component 305 and output component 315).

Controller 320 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor that can interpret and/or execute instructions. A processor is implemented in hardware, firmware, or a combination of hardware and software. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, or an optical memory) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
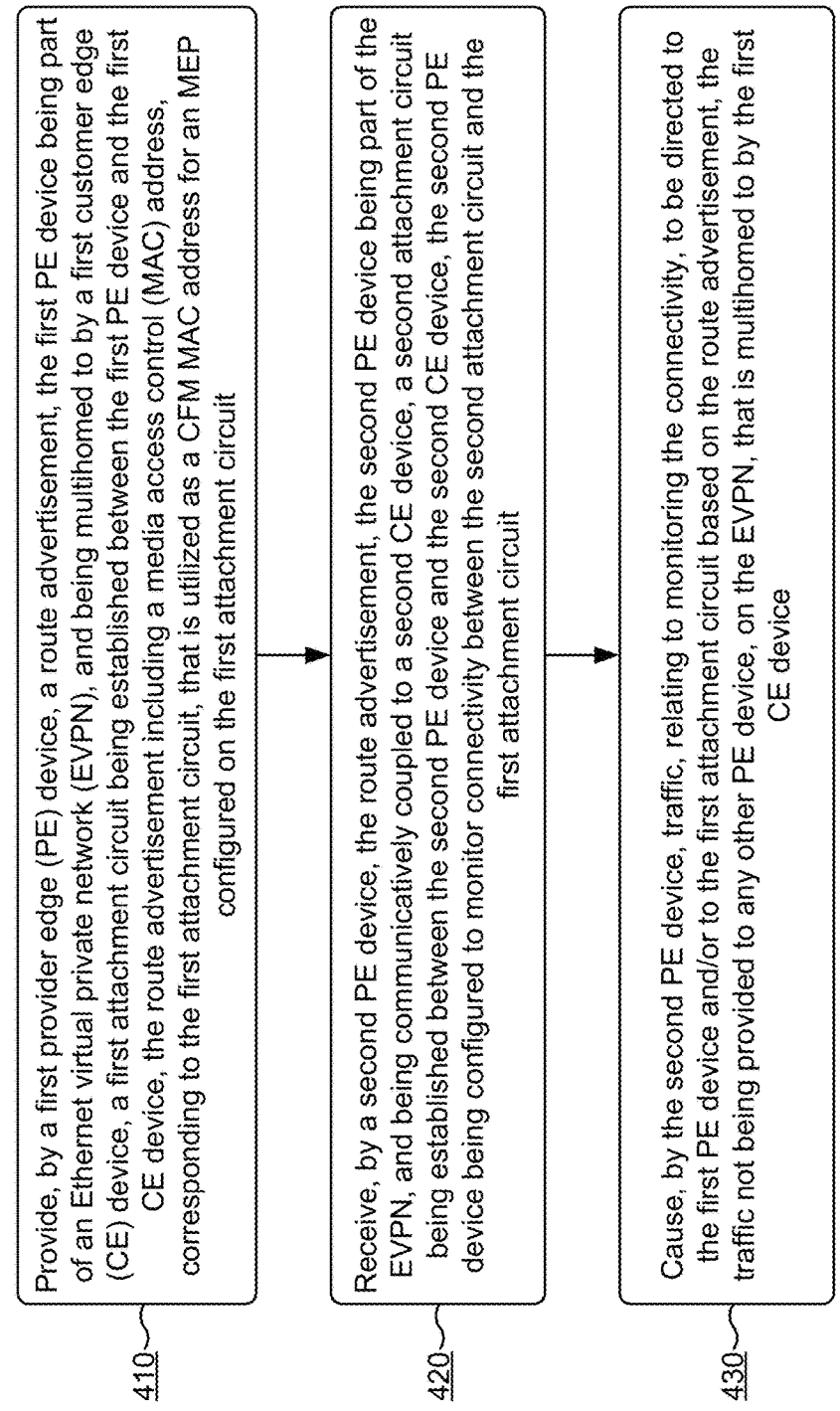
FIG. 4 is a flow chart of an example process for facilitating performance monitoring over an EVPN.

FIG. 4 is a flow chart of an example process 400 for facilitating performance monitoring over an EVPN. In some implementations, one or more process blocks of FIG. 4 may be performed by a first PE device (e.g., a first PE 210) and/or a second PE device (e.g., a second PE 210). In some implementations, one or more process blocks of FIG. 4 may be performed by another device or a group of devices separate from or including the first PE device and/or the second PE device, such as another PE device (e.g., another PE 210) or a CE device (e.g., CE 205).

As shown in FIG. 4, process 400 may include providing, by the first PE device, a route advertisement, the first PE device being part of an Ethernet virtual private network (EVPN), and being multihomed to by a first customer edge (CE) device, a first attachment circuit being established between the first PE device and the first CE device, the route advertisement including a media access control (MAC) address, corresponding to the first attachment circuit, that is utilized as a connectivity fault management (CFM) MAC address for a maintenance endpoint (MEP) configured on the first attachment circuit (block 410). For example, the first PE device (e.g., using switching component 310, output component 315, controller 320, and/or the like) may provide a route advertisement, as described above in connection with FIG. 1. In some implementations, the first PE device may be part of an EVPN, and may be multihomed to by a first CE device. In some implementations, a first attachment circuit may be established between the first PE device and the first CE device. In some implementations, the route advertisement may include a MAC address, corresponding to the first attachment circuit, that is utilized as a CFM MAC address for an MEP configured on the first attachment circuit.

As further shown in FIG. 4, process 400 may include receiving, by the second PE device, the route advertisement, the second PE device being part of the EVPN, and being communicatively coupled to a second CE device, a second attachment circuit being established between the second PE device and the second CE device, the second PE device being configured to monitor connectivity between the second attachment circuit and the first attachment circuit (block 420). For example, the second PE device (e.g., using input component 305, switching component 310, controller 320, and/or the like) may receive the route advertisement, as described above in connection with FIG. 1. In some implementations, the second PE device may be part of the EVPN, and may be communicatively coupled to a second CE device. In some implementations, a second attachment circuit may be established between the second PE device and the second CE device. In some implementations, the second PE device may be configured to monitor connectivity between the second attachment circuit and the first attachment circuit.

As further shown in FIG. 4, process 400 may include causing traffic, relating to monitoring the connectivity, to be directed to the first PE device and/or to the first attachment circuit based on the route advertisement, the traffic not being provided to any other PE device, on the EVPN, that is multihomed to by the first CE device (block 430). For example, the second PE device (e.g., using switching component 310, output component 315, controller 320, and/or the like) may cause traffic, relating to monitoring the connectivity, to be directed to the first PE device and/or to the first attachment circuit based on the route advertisement, as described above in connection with FIG. 1. In some implementations, the traffic may not be provided to any other PE device, on the EVPN, that is multihomed to by the first CE device.

Process 400 may include additional implementations, such as any single implementation or any combination of implementations described below and/or in connection with one or more other processes described elsewhere herein.

In some implementations, the second PE device may be configured to monitor the connectivity based on performance monitoring when CFM MEP is configured. In some implementations, the second PE device may be configured as a maintenance endpoint (MEP). In some implementations, the traffic may include a unicast packet having the MAC address as a destination address. In some implementations, the route advertisement may include a Type 2 route advertisement. In some implementations, the route advertisement may not advertise reachability of the first attachment circuit based on an Ethernet segment identifier (ESI). In some implementations, an Ethernet segment identifier (ESI) value in the route advertisement may be set to '0'.

In some implementations, the first CE device may be multihomed to the first PE device, and to at least one other PE device on the EVPN, based on an All-Active redundancy mode of operation. In some implementations, the second PE device may be a remote PE device that is not associated with an Ethernet segment relating to the first CE device. In some implementations, the traffic may not be flooded to multiple PE devices on the EVPN. In some implementations, the EVPN may be configured as a multipoint-to-multipoint network. In some implementations, providing the route advertisement, and receiving the route advertisement, may be performed via a control plane.

In some implementations, the first PE device may be configured to monitor the connectivity between the first attachment circuit and the second attachment circuit. In some implementations, the second PE device may be multihomed to by the second CE device. In some implementations, the second PE device may provide another route advertisement. In some implementations, the other route advertisement may include a MAC address, corresponding to the second attachment circuit, that is utilized as a CFM MAC address for an MEP configured on the second attachment circuit. In some implementations, the first PE device may receive the other route advertisement. In some implementations, the first PE device may cause additional traffic, relating to monitoring the connectivity, to be directed to the second PE device and/or to the second attachment circuit based on the other route advertisement. In some implementations, the additional traffic may not be provided to any other PE device, on the EVPN, that is multihomed to by the second CE device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
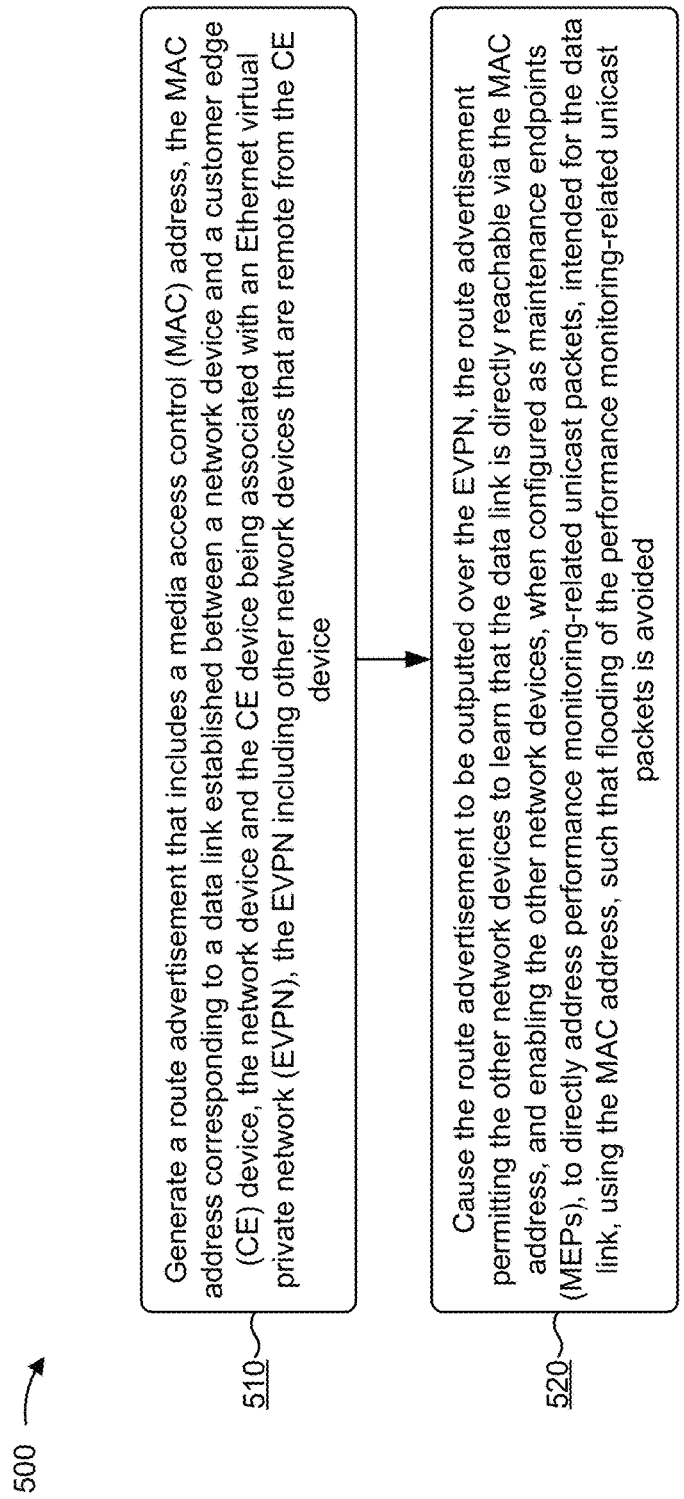
FIG. 5 is a flow chart of an example process for facilitating performance monitoring over an EVPN.

FIG. 5 is a flow chart of an example process 500 for facilitating performance monitoring over an EVPN. In some implementations, one or more process blocks of FIG. 5 may be performed by a network device, such as a PE device (e.g., PE 210). In some implementations, one or more process blocks of FIG. 5 may be performed by another device or a group of devices separate from or including the network device, such as another PE device (e.g., another PE 210) or a CE device (e.g., CE 205). In some implementations, the network device may include one or more memories, and one or more processors to perform process 500.

As shown in FIG. 5, process 500 may include generating a route advertisement that includes a media access control (MAC) address, the MAC address corresponding to a data link established between the network device and a customer edge (CE) device, the network device and the CE device being associated with an Ethernet virtual private network (EVPN), the EVPN including other network devices that are remote from the CE device (block 510). For example, the network device (e.g., using input component 305, switching component 310, output component 315, controller 320, and/or the like) may generate a route advertisement that includes a MAC address, as described above in connection with FIG. 1. In some implementations, the MAC address may correspond to a data link established between the network device and a customer edge (CE) device. In some implementations, the network device and the CE device may be associated with an Ethernet virtual private network (EVPN). In some implementations, the EVPN may include other network devices that are remote from the CE device.

As further shown in FIG. 5, process 500 may include causing the route advertisement to be outputted over the EVPN, the route advertisement permitting the other network devices to learn that the data link is directly reachable via the MAC address, and enabling the other network devices, when configured as maintenance endpoints (MEPs), to directly address performance monitoring-related unicast packets, intended for the data link, using the MAC address, such that flooding of the performance monitoring-related unicast packets is avoided (block 520). For example, the network device (e.g., using switching component 310, output component 315, controller 320, and/or the like) may cause the route advertisement to be outputted over the EVPN, as described above in connection with FIG. 1. In some implementations, the route advertisement may permit the other network devices to learn that the data link is directly reachable via the MAC address, and may enable the other network devices, when configured as MEPs, to directly address performance monitoring-related unicast packets, intended for the data link, using the MAC address, such that flooding of the performance monitoring-related unicast packets is avoided.

Process 500 may include additional implementations, such as any single implementation or any combination of implementations described below and/or in connection with one or more other processes described elsewhere herein.

In some implementations, the performance monitoring-related unicast packets may be associated with delay measurements (ETH-DM) and/or synthetic loss measurements (ETH-SLM). In some implementations, the performance monitoring-related unicast packets may be associated with Ethernet Loopback (ETH-LB) messages and/or Ethernet Linktrace Reply (ETH-LTR). In some implementations, the MAC address may be associated with a physical port, of the network device, to which the CE device is communicatively coupled.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for facilitating performance monitoring over an EVPN. In some implementations, one or more process blocks of FIG. 6 may be performed by a network device (e.g., a PE 210). In some implementations, one or more process blocks of FIG. 6 may be performed by another device or a group of devices separate from or including the network device, such as another PE device (e.g., another PE 210) or a CE device (e.g., CE 205). In some implementations, a non-transitory computer-readable medium may store instructions. In some implementations, the instructions may include one or more instructions that, when executed by one or more processors of the network device, cause the one or more processors to perform process 600.

As shown in FIG. 6, process 600 may include generating a route advertisement that includes reachability information associated with an attachment circuit established between the network device and a customer edge (CE) device, the network device and the CE device being associated with an Ethernet virtual private network (EVPN), the EVPN including other network devices that are remote from the CE device (block 610). For example, the network device (e.g., using input component 305, switching component 310, output component 315, controller 320, and/or the like) may generate a route advertisement that includes reachability information associated with an attachment circuit established between the network device and a CE device, as described above in connection with FIG. 1. In some implementations, the network device and the CE device may be associated with an EVPN. In some implementations, the EVPN may include other network devices that are remote from the CE device.

As further shown in FIG. 6, process 600 may include causing the route advertisement to be outputted over the EVPN, the route advertisement permitting the other network devices to learn that the attachment circuit is directly reachable based on the reachability information, and enabling the other network devices, when configured to conduct performance monitoring in accordance with connectivity fault management (CFM), to directly address performance monitoring-related unicast packets, intended for the attachment circuit, using the reachability information, such that flooding of the performance monitoring-related unicast packets is avoided (block 620). For example, the network device (e.g., using input component 305, switching component 310, output component 315, controller 320, and/or the like) may cause the route advertisement to be outputted over the EVPN, as described above in connection with FIG. 1. In some implementations, the route advertisement may permit the other network devices to learn that the attachment circuit is directly reachable based on the reachability information, and may enable the other network devices, when configured to conduct performance monitoring in accordance with CFM, to directly address performance monitoring-related unicast packets, intended for the attachment circuit, using the reachability information, such that flooding of the performance monitoring-related unicast packets is avoided.

Process 600 may include additional implementations, such as any single implementation or any combination of implementations described below and/or in connection with one or more other processes described elsewhere herein.

In some implementations, the route advertisement may permit the other network devices to learn that the attachment circuit is directly reachable based on the reachability information so as to facilitate a linktrace procedure. In some implementations, the reachability information may include a MAC address. In some implementations, the MAC address may not be locally added in a data structure, of the network device, that stores route information.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

In this way, a remote PE device, configured as an MEP (e.g., in an Up MEP session), may directly transmit performance monitoring-related unicast packets to the multihomed PE device using the advertised MAC address. This eliminates the possibility of such unicast packets being treated as unknown unicast packets and flooded (e.g., as a traffic storm) to all PE devices on an EVPN, which reduces unneeded network traffic, thereby improving overall network performance. This also permits a remote PE device, configured as an MEP, to uniquely monitor connectivity between individual attachment circuits in a multihomed network operating in the All-Active redundancy mode, which enables appropriate identification of connectivity issues over an EVPN, thus improving CFM, including various related procedures, such as Loopback and Linktrace. For example, implementations, described herein, assist with Linktrace in an EVPN topology.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method, comprising:
    providing, by a first provider edge (PE) device, a route advertisement,
        the first PE device being part of an Ethernet virtual private network (EVPN), and being multihomed to by a first customer edge (CE) device,
        a first attachment circuit being established between the first PE device and the first CE device,
        the route advertisement including a media access control (MAC) address, corresponding to the first attachment circuit, that is utilized as a connectivity fault management (CFM) MAC address for a maintenance endpoint (MEP) configured on the first attachment circuit;
    receiving, by a second PE device, the route advertisement,
        the second PE device being part of the EVPN, and being communicatively coupled to a second CE device,
        a second attachment circuit being established between the second PE device and the second CE device,
        the second PE device being configured to monitor connectivity between the second PE device and the second CE device and the first PE device and the first CE device; and
    causing, by the second PE device and by monitoring the connectivity, traffic to be directed to the first PE device and/or to the first attachment circuit based on the route advertisement,
        the traffic not being provided to any other PE device, on the EVPN, that is multihomed to by the first CE device.

2. The method of claim 1, wherein the second PE device is configured to monitor the connectivity based on performance monitoring when CFM MEP is configured.

3. The method of claim 1, wherein the second PE device is configured as a maintenance endpoint (MEP).

4. The method of claim 1, wherein the traffic includes a unicast packet having the MAC address as a destination address.

5. The method of claim 1, wherein the route advertisement includes a Type 2 route advertisement.

6. The method of claim 1, wherein the route advertisement does not advertise reachability of the first attachment circuit based on an Ethernet segment identifier (ESI).

7. The method of claim 1, wherein an Ethernet segment identifier (ESI) value in the route advertisement is set to '0'.

8. The method of claim 1, wherein the first CE device is multihomed to the first PE device, and to at least one other PE device on the EVPN, based on an All-Active redundancy mode of operation.

9. The method of claim 1, wherein the second PE device is a remote PE device that is not associated with an Ethernet segment relating to the first CE device.

10. The method of claim 1, wherein the traffic is not flooded to multiple PE devices on the EVPN.

11. The method of claim 1, wherein the EVPN is configured as a multipoint-to-multipoint network.

12. The method of claim 1, wherein providing the route advertisement, and receiving the route advertisement, are performed via a control plane.

13. The method of claim 1, wherein the first PE device is configured to monitor the connectivity between the first attachment circuit and the second attachment circuit;
wherein the second PE device is multihomed to by the second CE device; and
the method further comprising:
providing, by the second PE device, another route advertisement,
the other route advertisement including a MAC address, corresponding to the second attachment circuit, that is utilized as a CFM MAC address for an MEP configured on the second attachment circuit;
receiving, by the first PE device, the other route advertisement; and
causing, by the first PE device, additional traffic, relating to monitoring the connectivity, to be directed to the second PE device and/or to the second attachment circuit based on the other route advertisement,
the additional traffic not being provided to any other PE device, on the EVPN, that is multihomed to by the second CE device.

14. A network device, comprising:
one or more memories; and
one or more processors to:
generate a route advertisement that includes a media access control (MAC) address,
the MAC address corresponding to a data link established between the network device and a customer edge (CE) device,
the MAC address associated with a physical port, of the network device, to which the CE device is communicatively coupled,
the network device being multihomed,
the network device and the CE device being associated with an Ethernet virtual private network (EVPN),
the EVPN including other network devices that are different than the CE device; and
cause the route advertisement to be outputted over the EVPN,
the route advertisement permitting the other network devices to learn that the data link is directly reachable, without transmitting network traffic to the other network devices on the EVPN, via the MAC address, and enabling the other network devices, when configured as maintenance endpoints (MEPs), to directly address performance monitoring-related unicast packets, intended for the data link, using the MAC address, such that flooding of the performance monitoring-related unicast packets is avoided.

15. The network device of claim 14, wherein the performance monitoring-related unicast packets are associated with delay measurements (ETH-DM) and/or synthetic loss measurements (ETH-SLM).

16. The network device of claim 14, wherein the performance monitoring-related unicast packets are associated with Ethernet Loopback (ETH-LB) messages and/or Ethernet Linktrace Reply (ETH-LTR).

17. The network device of claim 14, wherein the MAC address is not locally added in a data structure, of the network device, that stores route information.

18. A non-transitory computer-readable medium storing instructions, the instructions comprising:
one or more instructions that, when executed by one or more processors of a network device, cause the one or more processors to:
generate a route advertisement that includes reachability information associated with an attachment circuit established between the network device and a customer edge (CE) device,
the network device being multihomed,
the network device and the CE device being associated with an Ethernet virtual private network (EVPN),
the EVPN including other network devices that are different than the CE device; and
cause the route advertisement to be outputted over the EVPN,
the route advertisement permitting the other network devices to learn that the attachment circuit is directly reachable, without transmitting network traffic to the other network devices on the EVPN, based on the reachability information, and enabling the other network devices, when configured to conduct performance monitoring in accordance with connectivity fault management (CFM), to directly address performance monitoring-related unicast packets, intended for performance monitoring of the attachment circuit, using the reachability information, such that flooding of the performance monitoring-related unicast packets is avoided.

19. The non-transitory computer-readable medium of claim 18, wherein the route advertisement permits the other network devices to learn that the attachment circuit is directly reachable based on the reachability information so as to facilitate a linktrace procedure.

20. The non-transitory computer-readable medium of claim 18, wherein the reachability information includes a MAC address; and
wherein the MAC address is not locally added in a data structure, of the network device, that stores route information.

* * * * *